3,684,527
PROCESS FOR PRODUCING A CHIP-TYPE
FOOD PRODUCT

H. Paul Walter, Cambridge, Md., assignor to the United States of America as represented by the United States Department of Commerce, Economic Development Administration No Drawing. Continuation-in-part of application Ser. No. 848,362, Aug. 7, 1969, which is a continuation-in-part of application Ser. No. 737,804, June 18, 1968, which in turn is a continuation-in-part of application Ser. No. 670,792, Sept. 26, 1967, which in its turn is a continuation-in-part of application Ser. No. 529,948, Feb. 25, 1966, which in its turn is a continuation-in-part of application Ser. No. 311,662, Sept. 26, 1963, which in its turn is a continuation-in-part of application Ser. No. 107,914, May 5, 1961. This application June 30, 1970, Ser. No. 51,334

Int. Cl. A22c 25/00; A23l 1/00, 1/33
U.S. Cl. 99—111        4 Claims

ABSTRACT OF THE DISCLOSURE

A chip type food product of much improved flavor and texture is provided by preparing a mixture of ingredients, including wheat starch and a basic flavoring material, which mixture is cooked in such a manner as to obtain an intermediate product in the form of relatively small thin pieces, said pieces being subsequently cooked to obtain the final product.

---

The present application is a continuation-in-part of my co-pending patent application Ser. No. 848,362, filed Aug. 7, 1969; which is a continuation-in-part of my patent application Ser. No. 737,804, filed June 18, 1968; which is a continuation-in-part of my patent application Ser. No. 670,792, filed Sept. 26, 1967; which is a continuation-in-part of my patent application Ser. No. 529,948, filed Feb. 25, 1966; which is a continuation-in-part of my patent application Ser. No. 311,662, filed Sept. 26, 1963; which is a continuation-in-part of my patent application Ser. No. 107,914, filed May 5, 1961; all of said prior applications being now abandoned.

STATEMENT OF THE INVENTION

The present invention relates to food products of the "tidbit" or "chip" variety and involves both a final product ready for consumption which possesses extraordinary palatability due to novel combinations of ingredients and steps of processing the same including the cooking thereof; and also to the production of a novel intermediate product which is inedible as such but which is readily merchanised for being subsequently transformed into the final product.

It is, of course, very well known that potato chips consist essentially of thin pieces or strips of potato which have been deep fried in a suitable oil; and there are numerous chips on the market which are characterized by flavors other than potato, such as flavorings of corn, cheese, onion, garlic, barbeque, shrimp, etc. Sometimes there is packaged and marketed an intermediate food product characterized by the foregoing flavors which is intended for subsequent deep frying or other form of cooking.

As indicated hereinbefore, it is among the objects of the present invention to provide a novel and extraordinarily palatable food product which is generally of the chip type and which may derive its flavor from various ingredients, including seafoods such as clams, etc.; together with a novel process of making the same.

Another object is to provide a novel intermediate product as earlier referred to which, if properly packaged, will keep almost indefinitely, and which may be deep fried or otherwise cooked to obtain the improved final product.

Still another object is the attainment of the foregoing objectives in a manner which is relatively simple and inexpensive.

As before mentioned, the teachings of the present invention contemplate various flavorings, particularly in the area of seafoods; for example, shrimp, lobster, crab, scallops, oysters and clams.

While the other seafoods mentioned may be utilized with equal facility, the adaptability of the present invention to clams as particularly important.

It is, of course, well known that clams possess an unusually distinctive flavor; also that they are usually rather expensive to utilize in the manufacture of food products. The principal reason for this expense is that almost invariably the food processor insists on New England clams which are usually in fairly short supply, added to which are transportation costs, etc.

In the Chesapeake Bay area, the clam industry has grown somewhat in the past several years; and, at present, there are several hundred licensed hydraulic clam dredges operating in Maryland waters, each of which can easily produce between 100 and 200 bushels per week. However, the soft clam industry in this area has for many years suffered from an insufficient market to consume the very abuandant natural supply. These clams reseed themselves; and it appears that digging them up actually helps the reproduction system. The supply seems to be far in excess of anything that the immediate future demand can take care of.

Unfortunately, soft clams from the Chesapeake Bay area develop a rather unsightly red liquor during their spawning period in the cool water months; and this is usually unacceptable to restaurateurs who use them for frying, as well as to other food processors. However, this red liquor in no way affects quality, sanitation, etc.

I have discovered that, if processed as described hereinafter, the very abundant and inexpensive soft clams of the Chesapeake Bay area may be utilized to produce a clam flavored food product generally of the chip type, which is not only extraordinarily palatable, but which is devoid of the usually objectionable red coloration referred to hereinbefore.

The invention, then, comprises the features hereinafter fully described and as patricularly pointed out in the claims, the following description setting forth in detail certain illustrative embodiments of the present invention, these being indicative of but several of a number of ways in which the principles of the invention may be employed.

Starting with the following ingredieints (by weight):

|  | Percent | |
|---|---|---|
|  | Minimum | Maximum |
| Clams, fresh shucked | 25 | 51 |
| Wheat starch, powder form | 44 | 70 |
| Salt, powder form | 2 | 5 |
| Baking powder | .05 | 2 |
| Monosodium glutamate, pure powder form | .15 | 3 |
| Soy sauce | .085 | .17 |
| Lemon, pure juice | .025 | .068 |
| Water | 250 | 650 |

According to a batch process I have developed, the weighed, shucked clams and cold water in the amount of approximately 3½ times their volume (by weight) are placed in a closed vessel, heated to between approximately 212° F. to approximately 214° F., and held at the same for between approximately 5 minutes to approximately 20 minutes.

The vessel and its contents are then permitted to cool to room temperature, preferably while still closed.

During the aforementioned cooling step, the wheat starch is, in another vessel, dissolved in the remainder of cold water, preferably by slowly pouring the water onto the wheat starch while simultaneously stirring, thus eliminating lumps, etc., and assuring complete dissolution.

Next, the salt and baking powder are, in this order, added to the solution of wheat starch and water accompanied, in each instance, by even distribution, vigorous stirring, etc.

After the first-mentioned (closed) vessel, containing the shucked clams and water, has cooled to room temperature, it is opened and the clam solids are strained from the liquid. Then, the solids are comminuted into very small particles, as by chopping, blending, etc.

Following the relatively fine comminution of the clam solids, they are replaced in the clam juice from which they were strained.

Next, the mixture of comminuted clam particles and clam juice is mixed, at room temperature, with the wheat starch and water solution from the second vessel, accompanied by even distribution and vigorous stirring extending over an interval of several minutes' duration.

The monosidum glutamate is now added, followed by the addition of the lemon juice, in both instances accompanied by even distribution and stirring.

Then, the soy sauce is added to the aforementioned mixture with vigorous stirring, preferably both clockwise and counterclockwise, over an interval of several minutes' duration.

STAGE II

The mixture resulting from all of the procedures hereinabove set forth is heated in a closed vessel to a temperature of preferably between approximately 130° F. and approximately 212° F. During this step, it is usually best to quickly but thoroughly stir the mitxure until the mixture arrives at the consistency of a slurry of the desired viscosity, as will be described hereinafter.

The consistency or viscosity of the glutinous mixture of slurry may vary to a limited extent, and immediately following is a laboratory report with respect thereto.

SLURRY

Brookfield Viscosity (Brookfield Synchro-Lectric Viscosimeter Model RVT; Spindle No. 3; r.p.m. 50)

Results

| Temperature, ° F.: | Viscosity range, cps. |
|---|---|
| 182–185 | 325.0–400.0 |
| Approx. 174 | 510–550 |
| Approx. 157 | 950–1030 |
| Approx. 140 | 980–1070 |

From the foregoing it will be observed that the lowest viscosity range (in centiposes) resulted at 182°–185° F. and this constitutes the most desirable consistency of the glutinous mixture or slurry immediately prior to the drying step.

The glutinous mitxure or slurry resulting from the aforementioned cooking operation at the consistency mentioned is poured onto a thin and relatively smooth supporting surface, such as a baking sheet or tray, until it is evenly spread thereon into a layer of between approximately $\frac{1}{64}''$ and approximately $\frac{3}{8}''$ and preferably approximately $\frac{3}{16}''$. The slurry of the thickness described may be in the form of a large sheet or a number of smaller shapes. In any event, the slurry is subjected to a drying step while so constituted and supported.

In my aforementioned patent application Ser. Nos. 107,914 and 311,662, mention is made of the problem of the aforementioned slurry sticking to various supporting surfaces, including aluminum.

As stated in my aforementioned patent application Ser. No. 311,662, in attempting to solve this sticking problem, I have discovered that glass fabrics and laminates coated with TFE fluorocarbon resin (i.e. tetrafluoroethylene), a product known by the trademark "Armalon" is very satisfactory for supporting the glutinous mixture or slurry during the drying operation. Another equally satisfactory material is known in the trade as "Flurglass."

It will, of course, be readily understood by those skilled in the art that various other, and perhaps similar, products might be found equally as suitable for the purpose of supporting the slurry during the drying operation.

The supporting surface with the slurry thereon is baked in an oven, while horizontally disposed, until both the upper and lower surfaces of the slurry harden to a skin-like formation; and wherein the moisture content of the material so treated is reduced to, preferably, between approximately 7% and approximately 9.75%; but not less than approximately 6.25% and not more than approximately 14.85%. An acceptable way to achieve this last-mentioned result is to place the supporting surface with the slurry in a gas oven at room temperature, then setting the gas flame to produce a controlled oven temperature of approximately 200° F. for approximately 60 minutes. On the other hand, the gas oven may be preheated to approximately 200° F. in order to reduce the drying time. By this heating step, one surface of the mixture may first be hardened and thereafter the suporting surface, i.e. sheet or tray, etc., removed for an interval which is sufficient to permit the partially dried mixture to be turned over, and the heating step repeated.

The product resulting from the successive steps referred to is an intermediate one, whether the slurry is introduced to the heating step in the form of a large sheet or a number of smaller shapes. The product of the heat-treatment may be retained in size and shape or may be reduced to other and smaller shapes and/or sizes. The thickness of the various dehydrated pieces should be relatively thin as compared with their surface areas and, preferably range from between approximately $\frac{1}{128}''$ to approximately $\frac{24}{128}''$. Laboratory tests of this so-called intermediate product consistently establish the following degree of high purity:

| | |
|---|---|
| Standard Plate Count @ 32° C., per ml. or per gm. | <300 |
| Coliform Bacteria @ 35° C., solid media per ml. or per gm. | <1 |
| Gas tubes per ml. or per gm. | Neg. |
| Percent moisture | 7.15 |

As stated earlier herein, this intermediate product will, if properly packaged, keep almost indefinitely, thereby permitting it to be deep-fried or otherwise cooked—practically anywhere and anytime—while still obtaining the full benefits of the present invention.

The intermediate product, which I designate as "hupies," are characterized by a high degree of transparency, usually with miniscule particles of the flavoring distributed therethrough.

STAGE III

The present invention contemplates the deep frying of the aforementioned intermediate product in pure peanut oil that is batch tested and well deodorized, at between approximately 430° F. and approximately 475° F. and preferably between 450° F. and 475° F. According to this deep frying step, the peanut oil, so tested and deodorized, is preheated slowly until it reaches the temperature described.

It is a well accepted fact that normally deep frying temperatures rarely exceed 375° F. due to the nature of the oil and the breaking down thereof; and in but relatively few situations do deep frying temperatures exceed 400° F.

I have discovered that when pure peanut oil of the type described is heated to temperatures within the maximum ranges set forth, acceptable results are obtained; but when the oil is heated to between aproximately 450° F.

and 465° F. very superior and highly unexpected results are obtained. More specifically, at temperatures between 450° F. and 465° F. the articles or chips will, in effect, explode and expand to around four or five times the size prior to immersion in the oil. The chips obtained in the immediately aforementioned manner are very noticeably fluffier, crispier and lighter in texture than would otherwise be the case and literally melt on the tongue when placed in the mouth; all of which factors greatly enhance marketability.

The intermediate product which is immersed in the pure peanut oil heated in the manner described is left therein between approximately two seconds and approximately five seconds, and preferably between 3 and 4 seconds; and the resulting product, after removal from the hot oil, will be found to have acquired unique cup-like formations which are between approximately $\frac{1}{16}$ inch and approximately $\frac{3}{16}$ inch in thickness. These cup-like articles tend to retain excessive amounts of oil which should be immediately removed; and while one acceptable way of doing this is to simply invert the cup-like article until all of the oil has drained therefrom, a delicate tumbling action in a suitably heated atmosphere is to be preferred.

After the oil has been removed, the cup-like articles may be additionally flavored, as by salting, after which the product is ready for consumption or packaging and shipment, as desired.

The product resulting from the hereinbefore-described deep frying process possesses good shelf life, particularly when packaged in moisture-proof packages or vacuum containers.

It will be understood by those skilled in the art that while the present invention is described herein as being particularly applicable to seafoods, and especially clams which constitute the illustrative embodiments, it is not limited thereto, since it has equal application to flavorings derived from various meats, fowl, vegetables, fruits, etc., as well as artificial flavorings, and various combinations thereof.

While acceptable results might be obtained with other edible starches, I have discovered that wheat starch or a starch preponderant in wheat starch characteristics produces unexpectedly good results.

Wheat starch (*Triticum vulgare*) will absorb and hold more water than any other common starch. Since some moisture in the product is desirable from a flavor standpoint, the added water absorbed by the wheat starch makes the characteristics of this particular starch a superior product for this application. Wheat starch contains a higher percentage of Alpha linkage; and it is considered that this chemical linkage of the glucose in the starch molecule is responsible for the greater water holding capacity of the wheat starch.

As will be understood by those skilled in the art, various other modifications may be made without departing from the spirit and scope of the invention as defined in the appended claims. For example, pressure cooking may be resorted to in either or both of the aforementioned cooking steps in which case there will be considerable change in the time-temperature relationship.

I claim:

1. In a process for producing a chip-type product characterized by appetizing flavored food material selected from a member of the group consisting of seafood, meats, fowl, vegetables and fruit, the steps which include mixing the food material with water; cooking said combination; cooling the cooked combination; straining the cooked food from the water; comminuting the cooked food; recombining the comminuted cooked food with the water from which the cooked food was previously strained; making a solution of water and wheat starch; mixing said wheat starch solution and said cooked combination of food material and water; cooking said last-mentioned mixture until a slurry is obtained; forming said slurry into a sheet; supporting said sheet on a surface to which it will not adhere; reducing the moisture content of said sheet to between aproximately 6.25% and approximately 14.85% while supported on said surface; and forming the dehydrated product into pieces of between approximately $\frac{1}{128}$ inch and approximately $\frac{24}{128}$ inch in thickness.

2. A process according to claim 1 wherein the flavored food material constitutes clams, the cooking of the combined food material and water is conducted in a closed vessel at a temperature of between approximately 212° F. and approximately 214° F. for between approximately 5 minutes and approximately 20 minutes, the second cooking step is conducted in a closed vessel at a temperature of between approximately 130° F. and approximately 212° F. to thereby obtain a slurry, and wherein the dehydrated pieces of between approximately $\frac{1}{128}$ inch and approximately $\frac{24}{128}$ inch in thickness are deep fried.

3. A process according to claim 1 wherein the food material is a clam.

4. In a process for producing a chip-type product characterized by appetizing food material selected from a member of the group consisting of seafood, meats, fowl, vegetables and fruit, the steps which include mixing the food material with water; cooking the mixture of food material and water; cooling the mixture; straining the cooked food material; comminuting the cooked food material; recombining the comminuted cooked food material with the water from which it was previously strained; making a solution of water and an edible starch; mixing said starch solution and the recombined combination of cooked food material and water; cooking said last-mentioned mixture until a slurry is obtained; forming said slurry into a sheet; supporting said sheet on a surface to which it will not adhere; reducing the moisture content of said sheet to between approximately 6.25% and approximately 14.85% while supported on said surface; and forming the dehydrated sheet into smaller pieces.

References Cited
UNITED STATES PATENTS

| | | | |
|---|---|---|---|
| 3,027,258 | 3/1962 | Markakis et al. | 99—81 |
| 3,031,313 | 4/1962 | Morgan et al. | 99—204 X |
| 3,041,178 | 6/1962 | Marvin et al. | 99—111 |

HYMAN LORD, Primary Examiner

U.S. Cl. X.R.

99—1, 100, 107, 199, 204, 208, 209